(12) United States Patent
Fredell

(10) Patent No.: US 7,814,537 B2
(45) Date of Patent: Oct. 12, 2010

(54) METHOD, SOFTWARE PROGRAM, AND SYSTEM FOR MANAGING ACCESS TO INFORMATION AND THE TRANSFER THEREOF

(75) Inventor: Thomas L. Fredell, Sherborn, MA (US)

(73) Assignee: Intralinks, Inc., New York, NY (US)

( * ) Notice: Subject to any disclaimer, the term of this patent is extended or adjusted under 35 U.S.C. 154(b) by 750 days.

(21) Appl. No.: 11/625,126

(22) Filed: Jan. 19, 2007

(65) Prior Publication Data

US 2007/0118889 A1 May 24, 2007

Related U.S. Application Data

(62) Division of application No. 10/034,949, filed on Dec. 28, 2001, now Pat. No. 7,168,094.

(60) Provisional application No. 60/258,992, filed on Dec. 29, 2000.

(51) Int. Cl.
*H04L 29/06* (2006.01)
(52) U.S. Cl. .......................................... 726/8; 713/168
(58) Field of Classification Search ........................ None
See application file for complete search history.

(56) References Cited

U.S. PATENT DOCUMENTS 5,898,780 A * 4/1999 Liu et al. ..................... 713/155
5,923,756 A * 7/1999 Shambroom ................ 713/156

\* cited by examiner

*Primary Examiner*—Gilberto Barron, Jr.
*Assistant Examiner*—Venkat Perungavoor
(74) *Attorney, Agent, or Firm*—Greenberg Traurig, LLP

(57) ABSTRACT

A method for granting an access to information includes electronically establishing, by at least one intermediary server, through a first authentication procedure at least one first client login authentication data which allows at least one client processor to access the at least one intermediary server, electronically receiving, by the at least one intermediary server, at least one second client login authentication data from at least one host server, wherein the at least one second client login authentication data is established by the at least one host server using a second authentication procedure, wherein the at least one second client login authentication data allows the at least one client processor to access the at least one host server, wherein the first authentication procedure is separate from the second authentication procedure, and wherein the at least one intermediary server is independently managed from the at least one host server.

14 Claims, 9 Drawing Sheets

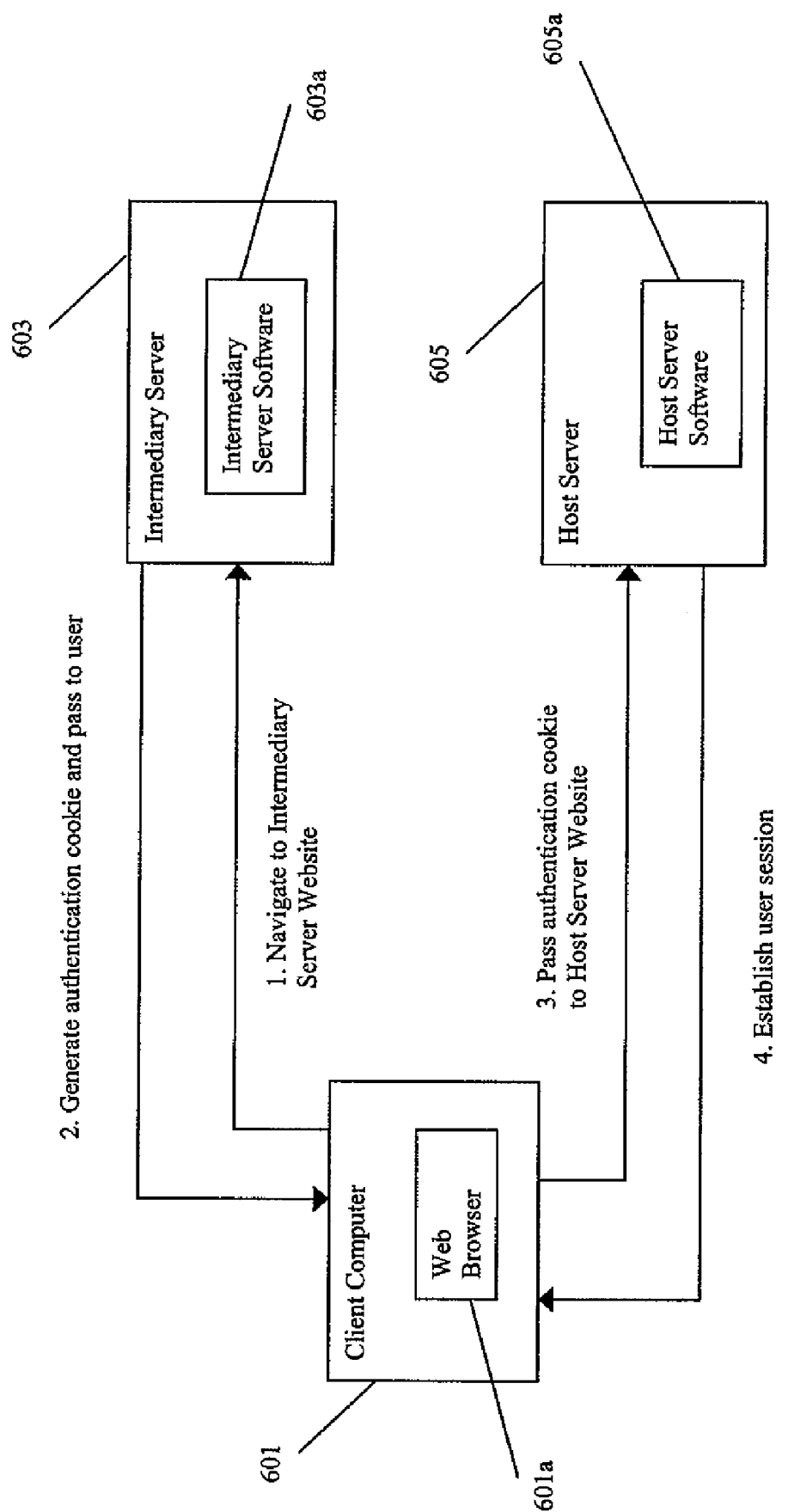

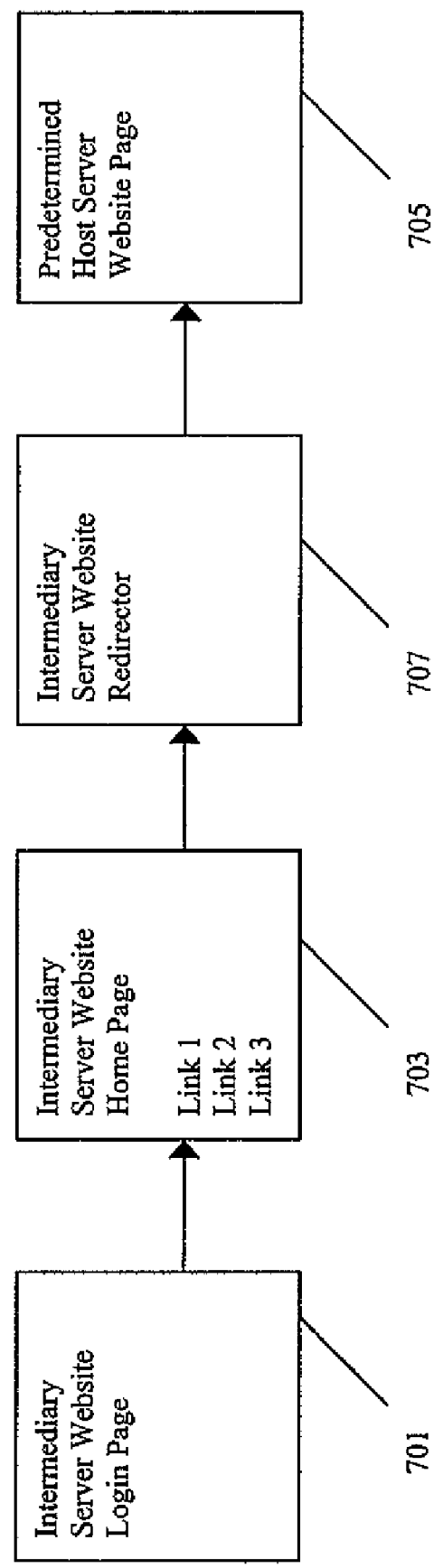

Outside IP Counsel Demo Workspace

| folder ◇ title ◇ | first posted ◇ | last updated ◇ | current |
|---|---|---|---|
| ABC, Inc. v. Doe | | | |
| Cross-license agreement | Eric Lambert/IntraLinks | Apr 6, 01 15:13 | updates |
| Summons & Complaint | Eric Lambert/IntraLinks | Apr 6, 01 15:12 | updates |
| Bills & Invoices | | | |
| Please upload all bills here | Eric Lambert/IntraLinks | Apr 6, 01 14:10 | updates |
| Forms & Policies | | | |
| Employee Trademark Guidelines | Eric Lambert/IntraLinks | Apr 6, 01 14:59 | updates |
| New Employee IP presentation | Eric Lambert/IntraLinks | Apr 6, 01 15:20 | updates |
| Third Party Trademark Guidelines | Eric Lambert/IntraLinks | Apr 6, 01 15:44 | updates |
| Intellectual Property Portfolio | | | |
| ABC Inc. Domain Name List | Eric Lambert/IntraLinks | Apr 6, 01 15:03 | updates |
| ABC Inc. P List | Eric Lambert/IntraLinks | Apr 6, 01 15:01 | updates |
| Johnson v. ABC, Inc. | | | |
| Settlement Agreement | Eric Lambert/IntraLinks | Apr 6, 01 15:26 | updates |
| Noninfringement Opinions | | | |
| Opinion on Devis 0,000,001 Patent | Eric Lambert/IntraLinks | Apr 6, 01 15:24 | updates |
| Opinion on Lambert 0,000,000 Patent | Eric Lambert/IntraLinks | Apr 6, 01 15:18 | updates |
| Patents (pending) | | | |
| SandSifter patent application | Eric Lambert/IntraLinks | Apr 6, 01 15:31 | updates |
| Sample folder | | | |
| Sample publication | Eric Lambert/IntraLinks | Dec 11, 01 15:46 | updates |

IntraLinks — ATTY WORK PRODUCT, ATTY/CLIENT COMMUNICATION -- PRIVILEGED & CONFIDENTIAL

Fig. 8

METHOD, SOFTWARE PROGRAM, AND SYSTEM FOR MANAGING ACCESS TO INFORMATION AND THE TRANSFER THEREOF

CROSS-REFERENCE TO RELATED APPLICATIONS

This application is a divisional of U.S. Ser. No. 10/034,949, filed Dec. 28, 2001 now U.S. Pat. No. 7,168,094, which claims the benefit under 35 U.S.C. 119(e) of U.S. Provisional Application Ser. No. 60/258,992, filed Dec. 29, 2000. Each of the aforementioned applications is incorporated herein by reference in its entirety.

FIELD OF INVENTION

The present invention relates to a method, software program, and system for managing access to information and the transfer thereof. More particularly, the present invention relates to a method, software program, and system for managing, via the Internet, access to information and the transfer thereof. For the purposes of the present application, the term information is intended to include, but not be limited to, documents, messages, and comments.

BACKGROUND OF THE INVENTION

The widespread use of the Internet has brought forth a number of generic electronic document management solutions, particularly as applied to the World Wide Web (hereinafter "Web").

For example, the DocuTouch website (found at www.docutouch.com) appears to advertise a service with collaboration, authentication, repository, and digital signatures functionality.

In another example, the NetDocuments website (found at www.netdocuments.com) appears to advertise a service designed for document storage, collaboration, and management.

In another example, the DocuLogic website (found at www.doculogic.com) appears to advertise a service with document imaging, storage, and access functionality.

In another example, the Cimage website (found at www.cimage.com) appears to advertise a "Document Manager" portfolio consisting of a range of client, server, and Internet-based products for creating document management systems.

In another example, the FilesOnTheNet.com website (found at www.filesonthenet.com) appears to advertise an Internet-based document management service with scanning, indexing, sending, and viewing functionality.

Nevertheless, such conventional electronic document management solutions generally fail to provide a mechanism for permitting a "single sign-on" process across at lease two websites owned by different organizations. Furthermore, such conventional electronic document management solutions generally fail to implement a "security context" mechanism which ensures that only "slices" of information are available to a user signing-in from a given external website.

BRIEF DESCRIPTION OF THE DRAWINGS

FIG. 6 shows a diagram depicting the interconnection of computers according to an embodiment of the present invention;

FIGS. 7A and 7B show diagrams depicting log-in procedures according to an embodiment of the present invention; and FIG. 8 shows a Graphical User Interface ("GUI") according to an embodiment of the present invention.

Figure 1:
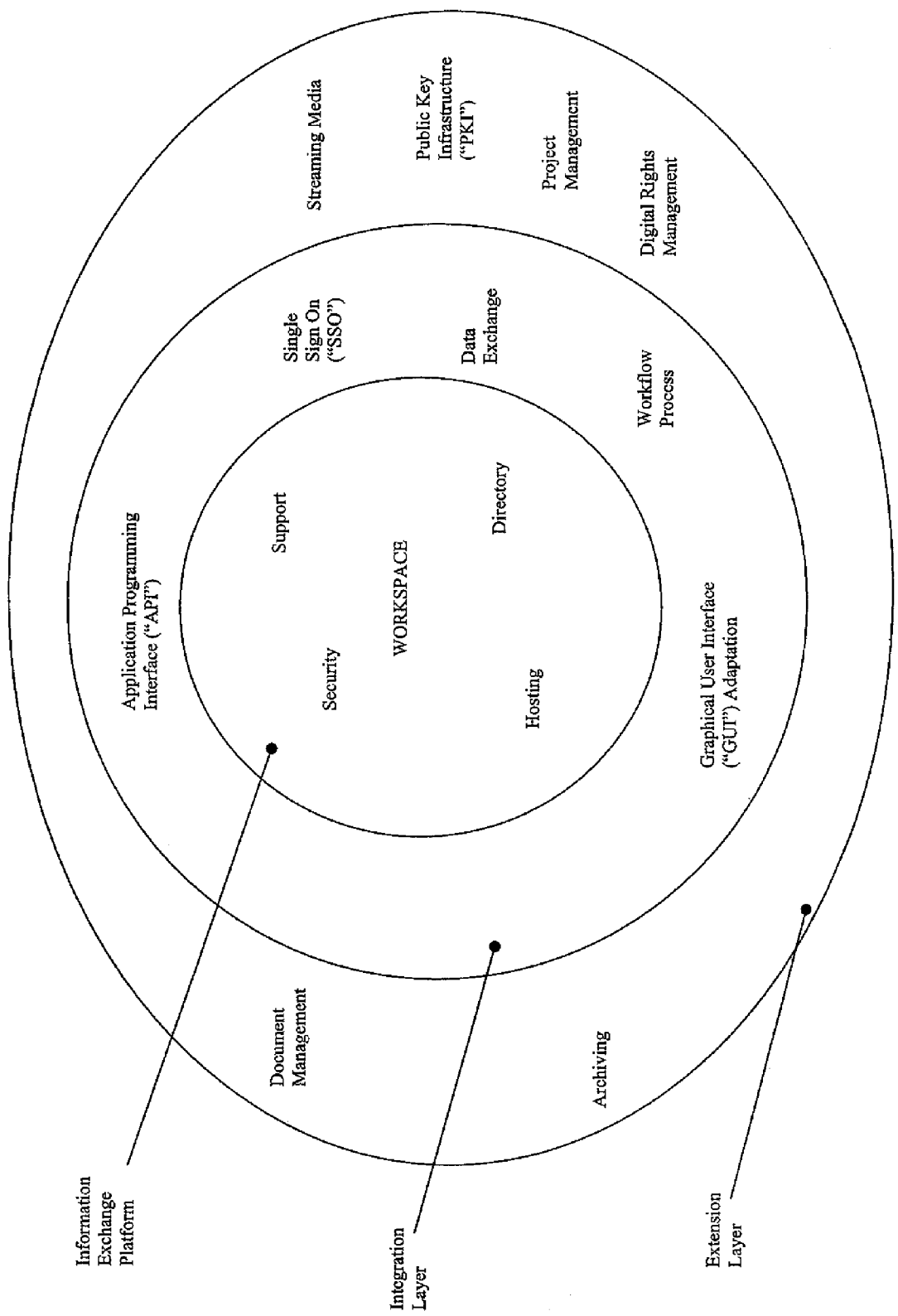
FIG. 1 shows a diagram depicting the interrelation of various functional elements of a website for managing access to and transfer of information according to an embodiment of the present invention.

Among those benefits and improvements that have been disclosed, other objects and advantages of this invention will become apparent from the following description taken in conjunction with the accompanying figures. The figures constitute a part of this specification and include an illustrative embodiment of the present invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In one embodiment a method for granting a user access to information is provided, comprising: connecting to an intermediary server using a client processor; transferring client login authentication data provided by the intermediary server to a host server after the user has connected to the intermediary server; and granting the user access to information associated with the host server when the client login authentication data is transferred to the host server.

In one specific example, which example is intended to be illustrative and not restrictive, the step of transferring the client login authentication data to the host server may further comprise first transferring the client login authentication data to the client processor from the intermediary server and then transferring the client login authentication data to the host server from the client processor. The client processor may include a client software program, the client software program may be used to transfer the login authentication data from the intermediary server, and the client software program may be used to transfer the login authentication data to the host server. The intermediary server may include a first server software program for communicating with the client software program and the host server may include a second server software program for communicating with the client software program. The client software program may comprise a web browser, the first server software program may comprise a first web server software program for providing a first website, and the second server software program may comprise a second web server software program for providing a second website.

In another specific example, which example is intended to be illustrative and not restrictive, the step of transferring the client login authentication data to the host server may further comprise transferring the client login authentication data to the host server from the intermediary server. The client processor may include a client software program, the intermediary server may include a first server software program, and the host server may include a second server software program, and wherein the client software program may communicate with the first server software program to connect the client processor with the intermediary server and the first server software program may communicate with the second server software program to transfer the client login authentication data to the host server from the intermediary server. The client software program may comprise a web browser, the first server software program may comprise a first web server software program for providing a first website, and the second server software program may comprise a second web server software program for providing a second website.

In another specific example, which example is intended to be illustrative and not restrictive, the client processor may be selected from the group including: a) a computer; b) a wireless telephone; and c) a Personal Digital Assistant ("PDA").

In another specific example, which example is intended to be illustrative and not restrictive, the method may further comprise the step of logging-in to the intermediary server by providing, from the client processor, a professed password associated with the user. The step of logging-in may further comprise receiving the professed password and determining if the professed password matches a correct password for the user. When the professed password matches the correct password, distinct login authentication data may be transferred in dependence upon the professed password provided by the user.

In another specific example, which example is intended to be illustrative and not restrictive, access to specific information forming a subset of all information associated with the host server may be dependent upon the distinct login authentication data transferred to the host server. The specific information may include at least one electronic document. Each electronic document may be in the form of a computer file. The computer file may include one of at least text data, binary data, still image data, moving image data, and audio data. Access to the electronic document may include the right to perform at least one of the actions selected from the group including: a) reviewing the electronic document; b) modifying the electronic document; and c) deleting the electronic document.

In another specific example, which example is intended to be illustrative and not restrictive, distinct login authentication data may be transferred from each of a number of intermediary servers. Access to specific information forming a subset of all information associated with the host server may be dependent upon the distinct login authentication data transferred to the host server. The specific information may include at least one electronic document. Each electronic document may be in the form of a computer file. The computer file may include one of at least text data, binary data, still image data, moving image data, and audio data. Access to the electronic document may include the right to perform at least one of the actions selected from the group including: a) reviewing the electronic document; b) modifying the electronic document; and c) deleting the electronic document.

In another specific example, which example is intended to be illustrative and not restrictive, the login authentication data may be transferred via the world wide web. The login authentication data may be transferred in an encrypted format.

In another embodiment a system for granting a user access to information is provided, comprising: means for connecting to an intermediary server using a client processor; means for transferring client login authentication data provided by the intermediary server to a host server after the user has connected to the intermediary server; and means for granting the user access to information associated with the host server when the client login authentication data is transferred to the host server.

In one specific example, which example is intended to be illustrative and not restrictive, the means for transferring client login authentication data provided by the intermediary server to the host server after the user has connected to the intermediary server may further comprise a client software program running on the client processor, and wherein the client software program may be used to transfer the login authentication data from the intermediary server to the client processor and then on to the host server. The intermediary server may include a first server software program for communicating with the client software program and the host server may include a second server software program for communicating with the client software program. The client software program may comprise a web browser, the first server software program may comprise a first web server software program for providing a first website, and the second server software program may comprise a second web server software program for providing a second website.

In another specific example, which example is intended to be illustrative and not restrictive, the means for transferring client login authentication data provided by the intermediary server to the host server after the user has connected to the intermediary server may further comprise a client software program running on the client processor, a first server software program running on the intermediary server, and a second server software program running on the host server, and wherein the client software program may communicate with the first server software program to connect the client processor with the intermediary server and the first server software program may communicate with the second server software program to transfer the client login authentication data to the host server from the intermediary server. The client software program may comprise a web browser, the first server software program may comprise a first web server software program for providing a first website, and the second server software program may comprise a second web server software program for providing a second website.

In another specific example, which example is intended to be illustrative and not restrictive, the client processor may be selected from the group including: a) a computer; b) a wireless telephone; and c) a Personal Digital Assistant ("PDA").

In another specific example, which example is intended to be illustrative and not restrictive, the system may farther comprise means for logging-in to the intermediary server by receiving, from the client processor, a professed password associated with the user. The means for logging-in may further comprise means for receiving the professed password and determining if the professed password matches a correct password for the user. When the professed password matches the correct password, distinct login authentication data may be transferred in dependence upon the professed password provided by the user. Access to specific information forming a subset of certain information associated with the host server may be dependent upon the distinct login authentication data transferred to the host server. The specific information may include at least one electronic document. Each electronic document may be in the form of a computer file. The computer file may include one of at least text data, binary data, still image data, moving image data, and audio data. Access to the electronic document may include the right to perform at least one of the actions selected from the group including: a) reviewing the electronic document; b) modifying the electronic document; and c) deleting the electronic document.

In another specific example, which example is intended to be illustrative and not restrictive, distinct login authentication data may be transferred from each of a number of intermediary servers. Access to specific information forming a subset of all information associated with the host server may be dependent upon the distinct login authentication data transferred to the host server. The specific information may include at least one electronic document. Each electronic document may be in the form of a computer file. The computer file may include one of at least text data, binary data, still image data, moving image data, and audio data. Access to the electronic document may include the right to perform at least one of the actions selected from the group including: a) reviewing the electronic document; b) modifying the electronic document; and c) deleting the electronic document.

In another specific example, which example is intended to be illustrative and not restrictive, the login authentication data may be transferred via the world wide web. The login authentication data may be transferred in an encrypted format.

In another embodiment a method for implementing a website sign-on procedure is provided, comprising: installing on an intermediary server a means for transferring login authentication information from the intermediary server to a client processor; installing on a host server a means for transferring the client login authentication information to the host server from the client processor; and installing on the host server a means for granting the user access to information associated with the host server when the client login authentication information is transferred to the host server.

In another embodiment a method for implementing a website sign-on procedure is provided, comprising: installing on an intermediary server a means for communicating with a client processor; installing on a host server a means for transferring client login authentication information to the host server from the intermediary server after the client processor communicates with the intermediary server; and installing on the host server a means for granting the user access to information associated with the host server when the client login authentication information is transferred to the host server.

In summary, one embodiment of the present invention relates to collaboration (e.g., business-to-business collaboration) and messaging (e.g., secure messaging) over the Internet (e.g., via the Web). Individual users from multiple businesses may work together on a project on-line and, in a secure messaging environment, the users may send and receive point-to-point encrypted messages and/or documents. Digital "workspaces" (i.e., segregated information exchange areas which may relate to specific needs and which may be implemented through hardware, software or a combination thereof) may allow members of a community of interest—for example, bankers, lawyers and accountants working together on a given corporate financing transaction—to exchange information and communicate within a framework that enhances collaboration and aids in the rapid completion of projects.

In one specific example, which example is intended to be illustrative and not restrictive, the present invention may be embodied in a website which is hosted on appropriate hardware running one or more software applications. The software applications may have integrated therein various services, or functionality, such as services designed for managing critical business-to-business communication with high levels of security. Such services may be offered over a global communications network (e.g., the Internet) and may require no dedicated client side software for use by an end-user (e.g., the services may be available via a web browser).

In this regard, FIG. 1 shows a diagram depicting the interrelation of various functional elements of a website for managing access to and transfer of information according to an embodiment of the present invention. It is noted that these functional elements provide, among other things, an information management mechanism which has: (a) high reliability and scalability; (b) high ease of use; (c) the ability to permit self-service and/or self-administration (e.g., by an end-user); (d) the ability to utilize current and/or future communication standards (e.g., Internet communication standards); (e) unified security and access; and (f) the ability to permit future expansion (e.g., in terms of features and/or scalability and/or communications standards).

Figure 2:
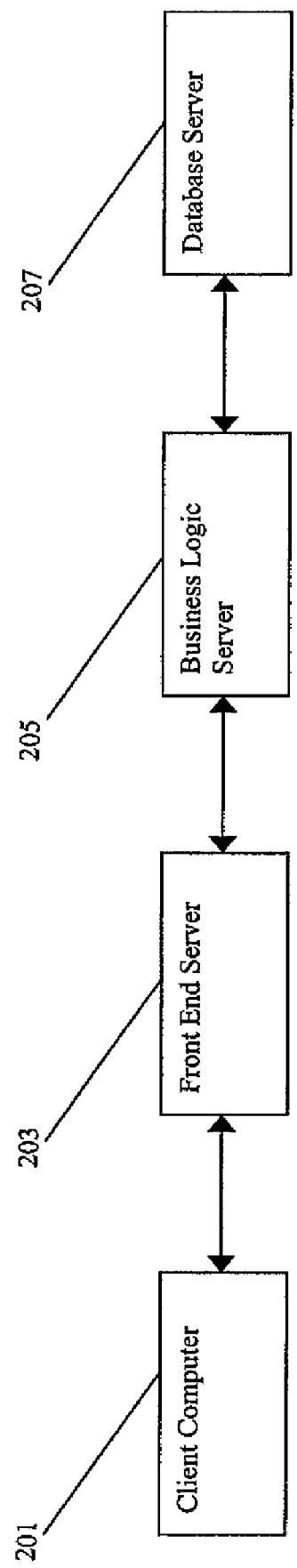
FIG. 2 shows a diagram depicting a server "strand" which may be used in connection with a website according to an embodiment of the present invention.

Referring now to FIG. 2, a diagram showing a server "strand" which may be used in connection with a website according to an embodiment of the present invention is shown. As seen in this FIG. 2, Client Computer 201 may communicate with Front End Server 203. The communication between Client Computer 201 and Front End Server 203 may be carried out via any desired wired and/or wireless communication link (e.g., a "dial-up" connection, a Wide Area Network, a Local Area Network, a DSL connection, a "cable" connection, a T1 connection, a T2 connection, and/or a T3 connection) using any desired communication protocol (e.g., HTTPS). Front End Server 203 may also communicate with Business Logic Server 205. The communication between Front End Server 203 and Business Logic Server 205 may likewise be carried out via any desired wired and/or wireless communication link (e.g., a "dial-up" connection, a Wide Area Network, a Local Area Network, a DSL connection, a "cable" connection, a T1 connection, a T2 connection, and/or a T3 connection) using any desired communication protocol (e.g., HTTPS). Finally, Business Logic Server 205 may communicate with Database Server 207. Again, the communication between Business Logic Server 205 and Database Server 207 may be carried out via any desired wired and/or wireless communication link (e.g., a "dial-up" connection, a Wide Area Network, a Local Area Network, a DSL connection, a "cable" connection, a T1 connection, a T2 connection, and/or a T3 connection) using any desired communication protocol (e.g., JDBC).

In one specific example, which example is intended to be illustrative and not restrictive, Front End Server 203 may utilize front-end software (e.g., NETSCAPE Enterprise Server Software), Business Logic Server 205 may utilize business logic software (e.g., BEA WebLogic 5.1 Software), and Database Server 207 may utilize database software (e.g., ORACLE 8I Database Software).

In another specific example, which example is intended to be illustrative and not restrictive, the server "strand" of FIG. 2 may utilize SUN's Enterprise Java (J2EE), which includes an Object Model, JDBC, and XML.

In another specific example, which example is intended to be illustrative and not restrictive, the server "strand" of FIG. 2 may utilize: (a) Entity Beans—used to provide logical objects (e.g., "User", "Document", "Workspace"); (b) Session Beans—used to provide actions affecting multiple objects (e.g., "User Manager", "Document Manager", "Workspace Manager"); (c) Servlets—used to take user requests, retrieve/store data, and pass data to JSP pages for presentation; and (d) JSP Pages—used for the presentation layer.

Figure 3:
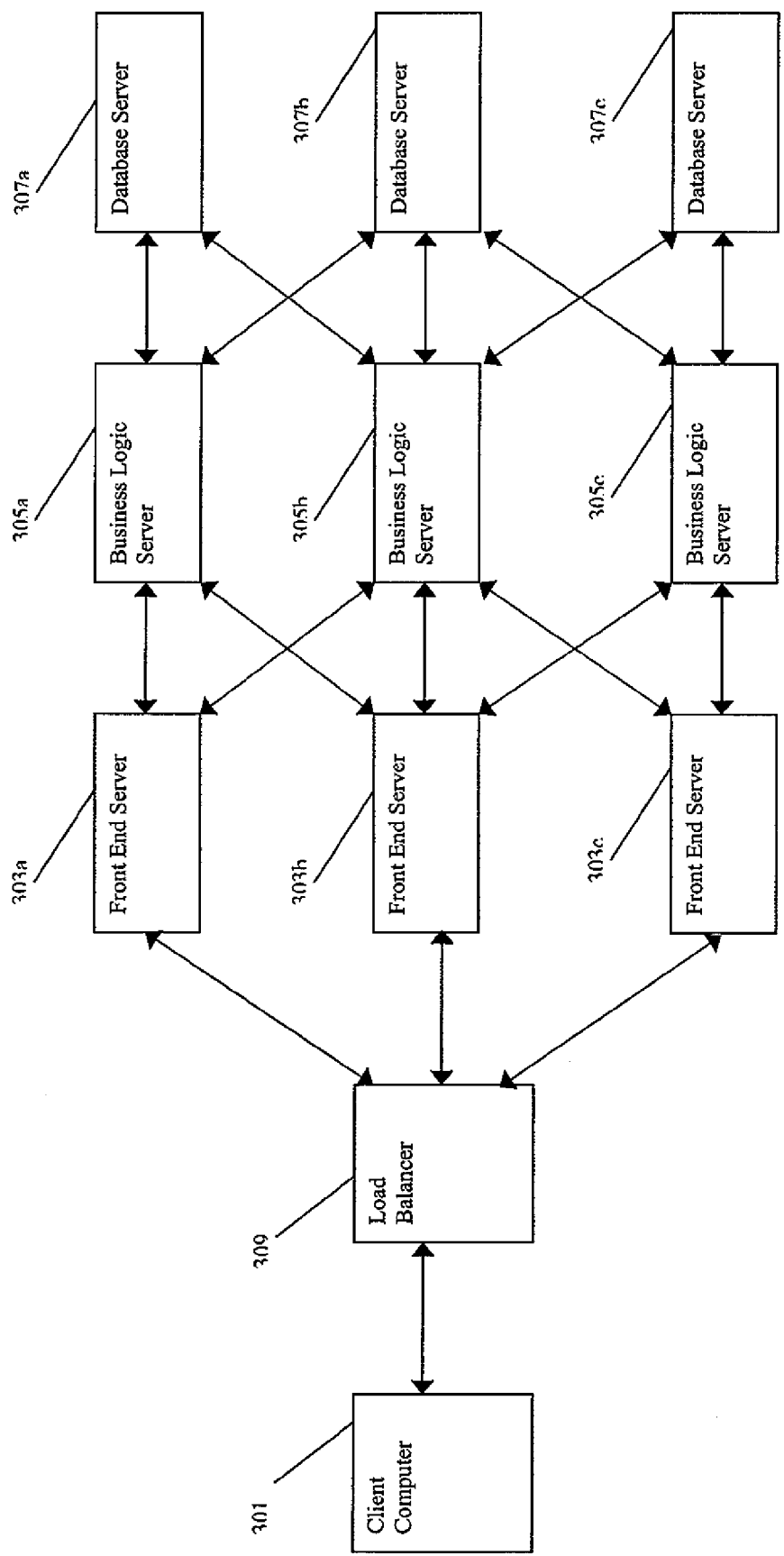
FIG. 3 shows a diagram depicting a redundant, load-balanced collection of server "strands" which may be used in connection with a website according to an embodiment of the present invention.

Referring now to FIG. 3, a redundant, load-balanced collection of server "strands" which may be used in connection with a website according to an embodiment of the present invention is shown. Each of the server "strands" of this FIG. 3 is similar to the single server "strand" of FIG. 2, with the exception that Load Balancer 309 is used to provide redundancy and load balancing. In one specific example, which example is intended to be illustrative and not restrictive, the Load Balancer 309 may be a RADWARE load balancer (and it may incorporate auto failover functionality).

Figure 4:
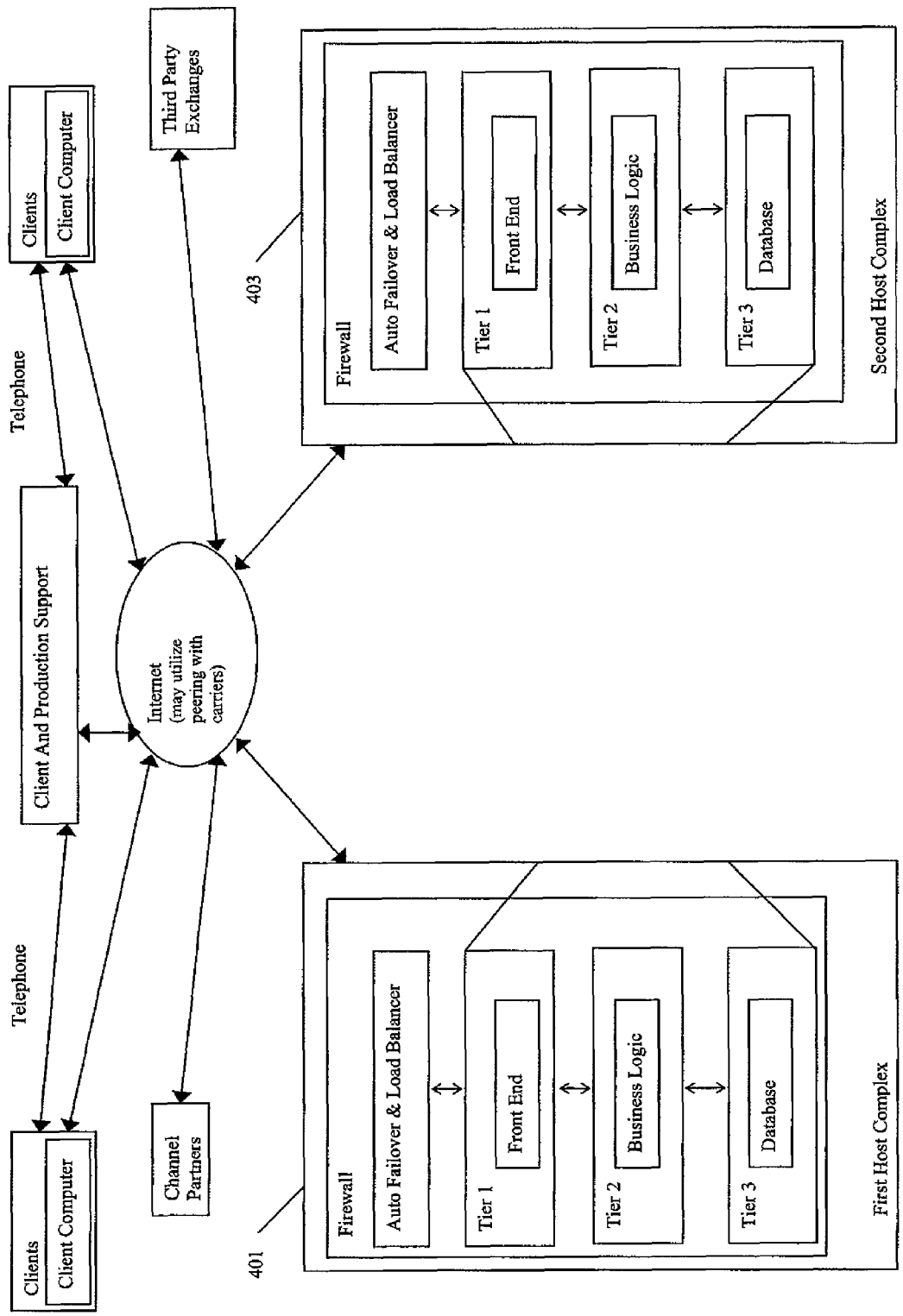
FIG. 4 shows a diagram depicting a hosting architecture and security setup which may be used in connection with a website according to an embodiment of the present invention.

Referring now to FIG. 4, a diagram showing a hosting architecture and security setup which may be used in connection with a website according to an embodiment of the present invention is shown. As seen in this FIG. 4, a website according to the present invention may be hosted at multiple sites, First Host Complex 401 and Second Host Complex 403. While two Host Complexes are shown, any desired number of such complexes (including one) may, of course, be used. In any case, each of First Host Complex 401 and Second Host Complex 403 may include "multi-tier" server setups running one or more server strands (e.g., the server "strands" of FIG. 3). In addition, as seen in this FIG. 4, each complex may include auto failover and load balancing, as well as a security firewall.

In one specific example, which example is intended to be illustrative and not restrictive, the host may be US Internetworking, the servers may be SUN Enterprise Servers, the server operating system may be UNIX, the database may be ORACLE, the load balancing may be across continents, the hosting sites may be in Annapolis, Milpitas, Amsterdam, and Tokyo, and the number of users may be 100,000+.

In another specific example, which example is intended to be illustrative and not restrictive, a multi-tier architecture may incorporate one or more Web Servers (each utilizing NETSCAPE Enterprise Server software, for example) for handling requests, one or more Application Servers (each utilizing BEA WebLogic software, for example) for handing logic (e.g., business logic), and one or more Database Servers (utilizing ORACLE database software, for example) for storing and handling data. Further, each tier may have redundancy and/or load-balancing capabilities to maximize system availability.

In another embodiment of a website according to the present invention a number of distinct collaborative services (which may be embodied in one or more software applications) may be integrated on a multi-tier hardware platform. In one specific example, which example is intended to be illustrative and not restrictive, such distinct collaborative services may include, but are not limited to, the following services provided by the assignee of the present application: IntraLoan, IntraAgency, DealSpace and DealSpace AT. One notable feature of the website according to this embodiment is that a common core set of product components (which may take the form of software components) may be "assembled" and hosted on behalf of a customer in order to provide an enterprise-wide environment upon which the customer may in turn host and manage collaborative workspaces. Another notable feature of the website of this embodiment is that the combination of each functional component on the hardware platform in a flexible manner may address the particular needs of the customer based on the specific industry or business purpose of the customer. Moreover, such needs may be addressed through configuration, rather than customization. Operational modules (e.g., software and/or hardware) of the website of this embodiment may include, but are not limited to, the following:

1) Unified Interface Module: Provides a unified interface which allows each user to gain access to a "desktop" containing all the workspaces to which the user has been given access.
2) Workspaces Module: Provides a secure environment where people come together to collaborate on and distribute information.
3) Documents Module: Provides the ability for participants with appropriate access rights to share information (e.g., documentation), send email alerts about the information and track who has/who has not seen given information. The Documents Module may also include the ability to provide version control.
4) Comments Module: Provides the ability for participants to post comments as well as get responses on comments.

In another embodiment of the present invention a mechanism with more than end-user functionality is provided. More particularly, this mechanism may allow a Network Service Provider (such as the assignee of the present application, or any desired party, for example) to provide services to various client organizations such that each client organization is provided a secure environment to create, host and actively mange one or more workspaces. This may be carried out through the use of one or more modules (e.g., software and/or hardware) and services thus provided to each client may include, but are not limited to, the following services:

1) A Business Group may be created for each area/department that has a particular need. Each Business Group may include an electronic directory analogous to a "rolodex" of all contacts that the Business Group has registered and/or external contacts. Each Business Group may include one or more internal coordinators, a contact list, and/or one or more Templates (see below).
2) Templates form the "cookie cutters" for workspaces. Each Template may relate to a particular business purpose and may control the "look and feel" of the GUI (e.g., according to certain business practices). Such Templates may be configured with appropriate functionality (e.g., User Roles and Phases (see below)) based on information that is provided. The Network Service Provider may consult with the client and provide Template (s) which are appropriate for the client's business.
3) An access control mechanism may perform the following functions: First, the access control mechanism may enable the basic function of the website by providing "Roles" which define what "Rights" people have to manipulate a workspace (e.g., the capability to create a document, manage a workspace, or create a workspace). A user may have a "System Role" (e.g., a role as a standard user, or a special administrative role). A user may also have a "Business Group Role" for each business group that such user can access (e.g., a role that enables them to edit Business Group templates or create workspaces for a Business Group). All users may have a "Workspace Role" for each workspace they can access (e.g., a role that enables them to view documents only, or to both view and edit documents, or view & edit documents and add participants). Second, "Permissions" may be granted to users or Roles within a workspace. Permissions grant specific rights to manipulate a system resource (a "system resource" is an object contained in the system, such as a document or comment) (e.g., the ability to view or edit a specific document). Permissions enable detailed access control on and in workspaces down to the object level. For example, within a specific workspace, there may be multiple users in a "Reviewer" role (which allows them to view but not edit documents), and each such user may have access to different documents within the specific workspace based on their individual Permissions.

4) Role Visibility, which applies within workspaces and/or other system components, may provide the proper relationships between the users. More particularly, Role Visibility may permit clients to establish appropriate relationships between workspace participants such that the established relationships maintain security and/or confidentiality parameters that essentially mimic the real world. For example, in a sell side M&A transaction, bidders for a company should not see other bidders (or know they exist). Role Visibility allows a client to establish a workspace where each bidder "doesn't see" other bidders.

5) Phases may provide a structured workflow that enables/disables certain groups of users (e.g., Phases may define when a certain user gets access to certain information). Phases may provide the transition functionality to enable a client to transition its workspace(s) through a natural work cycle. More particularly, Phases may enable/disable specific Roles in a workspace so that a client can manage the workflow of the workspace in a way that essentially mimics the real world. Referring again the above example of a sell side M&A transaction, a Preparation Phase may permit only those Roles necessary for compiling the final offering materials (e.g., investment bank, lawyer, financial advisor). On the other hand, an Open Phase may permit bidders to gain access to the workspace and to any information to which they have been granted access.

In one specific example, which example is intended to be illustrative and not restrictive, there may be three separate levels of Roles: System Clearance Roles, Business Group Membership Roles, and Workspace Roles. Each level may grant access to different functionality as well as rights to different resources. In this specific example, a user may have only one System Clearance Role (i.e., the rights associated with gaining access to the system) but the user may have multiple Business Group Membership Roles and/or multiple Workspace Roles. The Business Group Membership Role may provide a user with the ability to administrate a Business Group (e.g., create new workspaces, administer the business group contact list, update workspace Template(s)). A given Business Group Membership Role may relate directly to a particular Business Group and a user may have access to many Business Groups, each defined by a different Business Group Membership Role.

Likewise a user may have different Workspace Roles for each workspace to which that user has been permissioned. The Workspace Role provides a user with the ability to participate in a particular workspace with appropriate rights. For example, the Workspace Reader Role allows a user to view, but not edit, create, or delete, documents to which that user has been permissioned to access; the Workspace Publisher Role allows a user to view, edit, create, and delete documents to which that user has been permissioned to access. A Workspace Role may relate directly to a particular workspace and a user can have access to many Workspaces, each defined by a different Workspace Role. Accordingly, this unique combination of Roles (e.g., System Clearance Roles, Business Group Membership Roles, and Workspace Roles) provides a flexible environment that permits users to belong to a network of Business Groups and Workspaces (i.e. projects) where each user's Role dictates how the user works for each given purpose.

In another embodiment of the present invention a Context-sensitive Single Sign On ("CSSO") mechanism may be provided for enabling a Network Service Provider to furnish external websites with the ability to securely authenticate a user to the Network Service Provider, while restricting the user's access to only the set of information that pertains to the external web site.

In other words, the CSSO mechanism may be provided for generating a seamless user experience wherein multiple authentications across servers are eliminated. In addition, a secure messaging service may become a "component" of the external website.

In one specific example, which example is intended to be illustrative and not restrictive, a CSSO mechanism according to the present invention may be made up of the components including, but not limited to, the following:
1) A mechanism that allows user authentication credentials to be passed securely to the Network Service Provider by an external web site (Single Sign On);
2) A mechanism to validate that the authentication credentials were generated by the external site;
3) A mechanism to provide a user ID with multiple authentication credentials; and
4) A mechanism to link a user's authentication credentials to a specific set of information that is allowed for the external web site (the security context).

Of note, the Network Service Provider may use the CSSO mechanism of the present invention to enable external web sites to seamlessly and securely authenticate users into the Network Service Provider environment, while ensuring that no confidentiality boundaries are broken within the Network Service Provider system.

Figure 5:
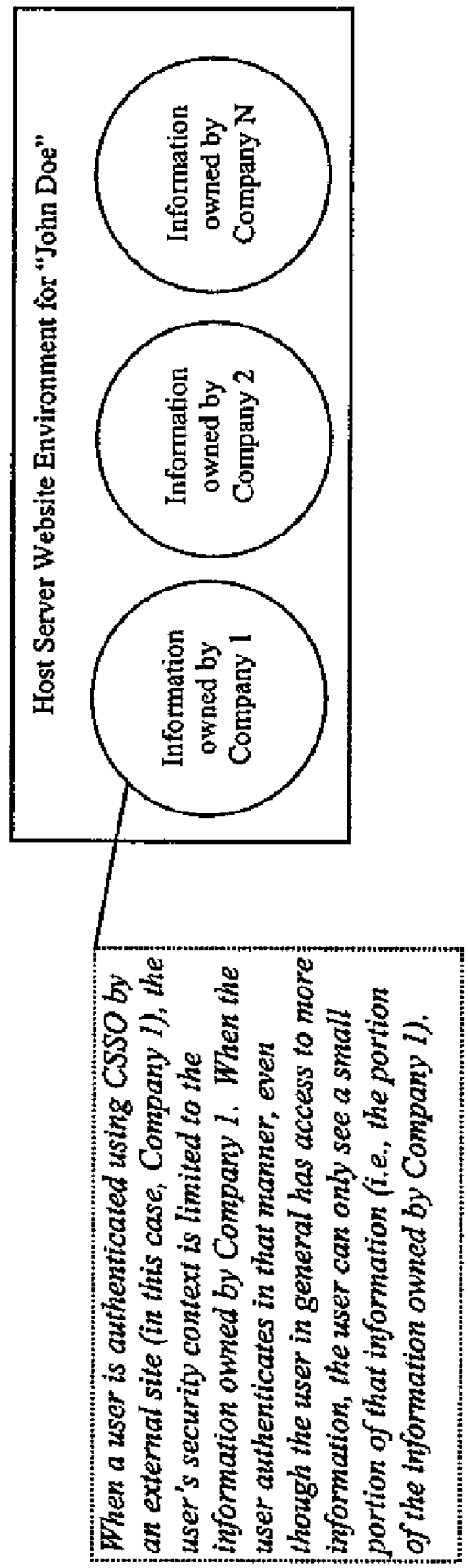
FIG. 5 shows a diagram depicting access to information according to an embodiment of the present invention.

Two specific examples describing the use of a CSSO mechanism according to an embodiment of the instant invention, which examples are intended to be illustrative and not restrictive, are as follows:
1) External partners and/or customers have existing websites into which they would like to integrate the Web-based services provided by the Network Service Provider. Each external partner and/or customer typically maintains its own proprietary user authentication mechanism for its website. Each external partner and/or customer could utilize the CSSO mechanism of the present invention to pass users from its website into the Network Service Provider's website without requiring an additional user authentication step.
2) Users of the Network Service Provider may have access rights to information that is associated with many different organizations. For example, a lawyer may be permitted to see information associated with separate M&A activity from MICROSOFT, from SUN, and from NETSCAPE. When a user is authenticated into the Network Service Provider's website using credentials from an external site, that user may be permitted access to information that is associated with the company that owns the external site; however, that user may not be permitted access to information that may be associated with a separate company that does not have a relationship to the external site (even if the user is otherwise permitted to have access to the information associated with the separate company). In other words, the user's access to information is limited to the user's authenticated "security context". This is shown schematically in the block diagram of FIG. 5.

In one specific example of the present invention, which example is intended to be illustrative and not restrictive, the CSSO mechanism may include authentication means for ensuring that secure authentication credentials are valid across web sites. This authentication means may include robust logic to anticipate and defeat potential security exploits. In addition, the security context may be associated with the set of authentication credentials used by the external website for a given user (e.g., a single user name and password).

Referring now to FIG. 6, a block diagram of the interconnection of computers configured for CSSO operation according to an embodiment of the present invention is shown. As seen in this FIG. 6, Client Computer 601 may be running Web Browser 601a, Intermediary Server 603 may be running Intermediary Server Software 603a (which may provide an Intermediary Server Website, not shown), and Host Server 605 may be running Host Server Software 605a (which may provide a Host Server Website, not shown). The Host Server Website may be provided by a Network Service Provider and the Intermediary Server Website may be external thereto and provided by a third party. While only one Client Computer, one Intermediary Server, and one Host Server are shown, any desired number of each may, of course, be used. In any case, each of Client Computer 601, Intermediary Server 603 and Host Server 605 may communicate with one another via the Internet, in a manner well known to one of ordinary skill in the art (e.g., through a "dial-up" connection, or through a dedicated broadband connection).

In operation, a user may use Web Browser 601a of Client Computer 601 to "navigate" to the Intermediary Server Website (i.e., connect to the Intermediary Server Website). Once there, the user may "log-in" to the Intermediary Server Website by providing a previously assigned username and password, for example (this log-in procedure is described in more detail below). The user may then "follow a link" on the Intermediary Server Website to the Host Server Website (e.g., Web Browser 6011a may be redirected to the Host Server Website by replacing the Intermediary Server Website in the Web Browser "window" or by opening a new Web Browser "window" or at least part of the Host Server Website may be shown in a "frame" associated with the Intermediary Server Website). At essentially the same time (e.g., shortly thereafter), client login authentication data may be transferred from the Intermediary Server 603 to the Host Server 605. Such client login authentication data may be transferred either: (a) as shown in this FIG. 6 from the Intermediary Server 603 to the Client Computer 601 and then on to the Host Server 605; or (b) from the Intermediary Server 603 to the Host Server 605 (without passing through Client Computer 601). In either case, the client login authentication data (which may be "one-time" data) may comprise a "cookie" generated by the Intermediary Server 603 which may contain information about the current user as well as a timestamp and user ID. Further, the cookie may be digitally signed by the Intermediary Server 603, the cookie may be encrypted using the Network Service Provider's public key, and the cookie domain may be set to allow it to be shared.

The Host Server 605 may then examine the client login authentication data transferred thereto (e.g., by decrypting the cookie, checking the signature, checking the timestamp, and checking if the cookie has been used). If the checks are successful, the Host Server 605 may then establish an authenticated session with Client Computer 601 and grant access to information associated therewith (e.g., information which is stored on Host Server 605 and/or information which is obtainable by Host Server 605 (e.g., information stored in an accessible database) in dependence upon the specific characteristics of the client login authentication data. In one specific example, which example is intended to be illustrative and not restrictive, different users logged into the same Intermediary Server may be granted access to different information associated with the Host Server 605. In another specific example, which example is intended to be illustrative and not restrictive, the same user may be granted access to different information associated with Host Server 605 depending upon which specific Intermediary Server (chosen from a plurality of possible Intermediary Servers) the user and had logged into.

Referring now to FIG. 7A, a diagram showing a typical procedure for logging-in to the Intermediary Server Website of FIG. 6 according to an embodiment of the present invention is depicted. As seen in this FIG. 7, the Intermediary Server Website may present the user with a Login Page 701 for receiving a Username and Password. Assuming that the Username and Password are correct, the user is then presented with Intermediary Server Website Homepage 703. Various links, including a link to a Predetermined Host Server Website Page 705, may be arranged on the Intermediary Server Website Homepage 703. Upon selection of this link by the user an Intermediary Server Website Redirector 707 may redirect the user's Web Browser 601a to the Predetermined Host Server Website Page 705 without requiring additional authentication input from the user. In one specific example, which example is intended to be illustrative and not restrictive, the link to the Predetermined Host Server Website Page 705 may be a link to a secure in-box.

Figure 7B:
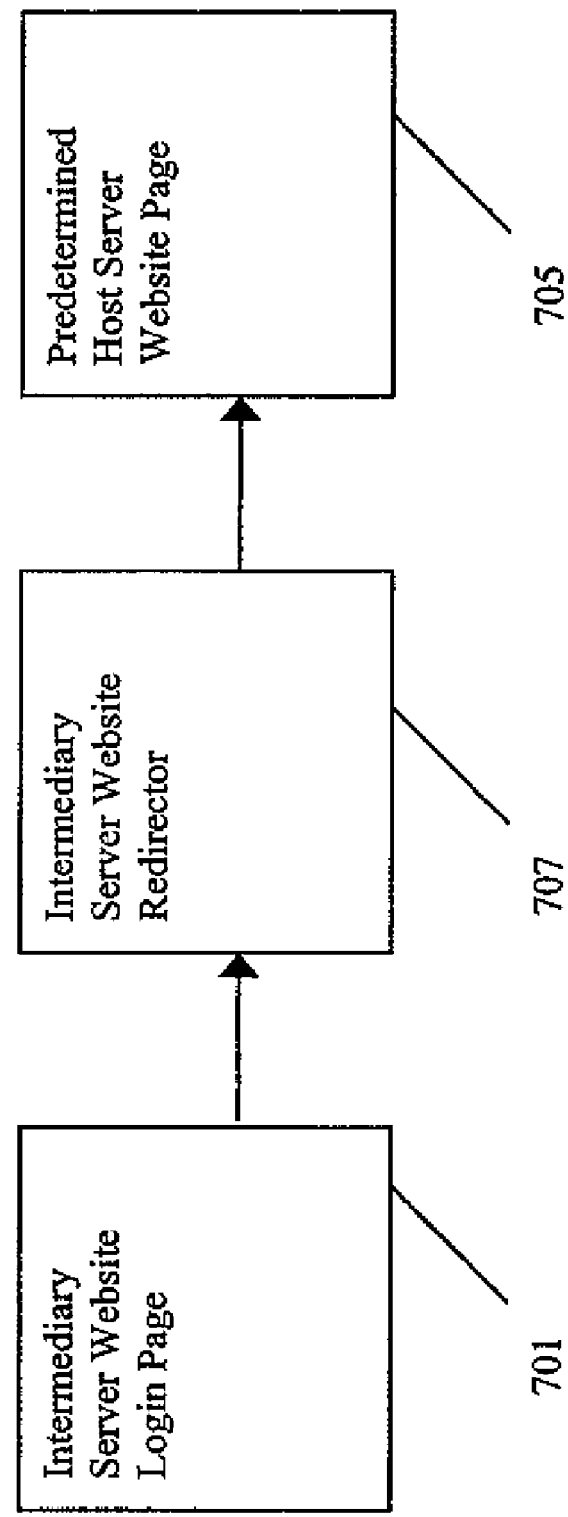

Of note, as seen in FIG. 7B, appropriate application logic may be utilized so that a user's Web Browser 601a may alternatively be sent directly to the Predetermined Host Server Website Page 705 by the Intermediary Server Website Redirector 707 if the log-in at Login Page 701 is not typically but, rather, occurs via notification or after session timeout. In this regard, such a notification may be generated by the Host Server Website when a session timeout occurs in order to "point to" or redirect the user's Web Browser 601a to the Intermediary Server Website so that the log-in procedure may be carried out once again. A notification is an alert from the Host Server 605 (e.g., an electronic mail message) sent to the user indicating, for example, a change in the data stored on a workspace, or a change in the Role or permissions for a user of a workspace.

In another embodiment of the present invention a CSSO mechanism may include a standards-based infrastructure for directory synchronization (e.g., the updating and maintenance of user information). In one specific example, which example is intended to be illustrative and not restrictive, the CSSO mechanism may include a Directory Services Markup Language ("DSML") infrastructure for permitting communication between an external website and a website provided by a Network Service Provider. The DSML is an open standard from the DSML Organization (www.dsml.org). The DSML, which provides an XML schema for representing and exchanging directory information, is directory independent (e.g., the directory may utilize the Lightweight Directory Access Protocol ("LDAP"), a proprietary vendor directory (e.g., the Microsoft Active Directory), or proprietary database tables) and may be used for exchanging directory information and performing "actions". For example, which example is intended to be illustrative and not restrictive, one could use DSML+Directory Action, where the Directory Action is one of: (a) Delete User; (b) Add User; (c) Update User; and (d) Dump Users. Further still, in another example, the directory synchronization process may be carried out through the request of actions via an encrypted HTTPS connection (e.g., the host website may define a URL and a user may pass to the URL a desired action).

In summary, the CSSO mechanism of the present invention may be used to permit a Network Service Provider to provide services that can seamlessly integrate with existing web sites without violating the Network Service Provider's status as a secure, neutral third party. This provides end-users with the ability to gain access to their information in a unified view, across websites provided by various companies with which they are collaborating, while also providing the ability for external sites to authenticate users without violating any confidentiality boundaries.

In another embodiment of the present invention customer support (e.g., 24-hour customer support) may be provided so as to furnish a comprehensive and readily accessible platform.

In another embodiment of the present invention, a website including task tracking and/or calendaring functions may be provided.

In another embodiment of the present invention, a website which is easy to use may be provided. In one specific example, which example is intended to be illustrative and not restrictive, a GUI similar to the one shown in FIG. 8 may be utilized. More particularly, the GUI may provide: 1) easy, fast access to information across transactions and/or projects (e.g., via a "What's New" feature); 2) a mechanism for bringing desired information to the forefront; 3) a mechanism for providing one login to all services; 4) a consistent experience; and 5) enhanced contact capabilities.

In another embodiment of the present invention, a website including self-service capabilities may be provided. In one specific example, which example is intended to be illustrative and not restrictive, the self-service capabilities may include:

1) A Streamlined Workflow—Permits users to create and/or delete workspaces and add and/or remove users easily.
2) Use Of The Template Concept—Permits the storage of common settings, the mapping of business practices, and the direct change of various parameters.

While a number of embodiments of the present invention have been described, it is understood that these embodiments are illustrative only, and not restrictive, and that many modifications may become apparent to those of ordinary skill in the art. For example, while the present invention has been described principally in connection with a website, the invention may, of course, be implemented in connection with any desired communication mechanism. Further, while the Front End Server, the Business Logic Server, and the Database Sever of each server "strand" have been described as separate units, two or more of these may, of course, be integrated into a single unit (e.g., a single server carrying out the functions of both the Front End Server and the Business Logic Server or a single server carrying out the functions of the Front End Server, the Business Logic Server, and the Database). Further still, it is to be understood that the term "server" used throughout the present application is intended to include, but not be limited to, a computer server. Further still, the present invention may be embodied in the form of one or more computer-implemented process and/or one or more systems for practicing those processes. Further still, the present invention may be embodied in the form of computer program code including computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Further still, when implemented on a computer, the computer program code segments may configure the computer to create specific logic circuits or processing modules.

What is claimed is:

1. A method for granting an access to information, comprising:
    a) electronically establishing, by at least one intermediary server, through a first authentication procedure at least one first client login authentication data which allows at least one client processor to access the at least one intermediary server;
    b) electronically receiving, by the at least one intermediary server, at least one second client login authentication data from at least one host server,
        i) wherein the at least one second client login authentication data is established by the at least one host server using a second authentication procedure,
        ii) wherein the at least one second client login authentication data allows the at least one client processor to access the at least one host server,
        iii) wherein the first authentication procedure is separate from the second authentication procedure, and
        iv) wherein the at least one intermediary server is independently managed from the at least one host server;
    c) electronically storing, by the at least one intermediary server, at least one second client login authentication data, in one or more data structures;
    d) electronically granting, by the at least one intermediary server, an access to a content of the at least one intermediary server to the at least one client processor when the at least one intermediary server receives the at least one first client login authentication data from the at least one client processor;
    e) electronically receiving, by the at least one intermediary server, a request to access the at least one host server from the at least one client processor; and
    f) electronically providing, by the at least one intermediary server, the at least one second client login authentication data to the at least one host server after the at least one client processor has connected to the at least one intermediary server, wherein the at least one client processor avoids a need to use the second authentication procedure to access the at least one host server.

2. The method of claim 1, wherein the step of providing the at least one second client login authentication data further comprises transferring the at least one second client login authentication data to the at least one client processor from the at least one second intermediary server.

3. The method of claim 1, wherein the step of providing the at least one second client login authentication data further comprises transferring the at least one second client login authentication data to the at least one host server from the at least one intermediary server.

4. The method of claim 1, wherein the at least one client processor is selected from the group including: a) a computer; b) a wireless telephone; and c) a Personal Digital Assistant.

5. The method of claim 1, wherein the at least one second login authentication data is provided via the world wide web.

6. The method of claim 5, wherein the at least one second login authentication data is provided in an encrypted format.

7. A computer system for granting an access to information, the computer system comprising:
    memory having at least one region for storing computer executable program code; and
    an intermediary server processor for executing the program code stored in the memory, wherein the program code comprises:

a) code to establish, by at least one intermediary server, through a first authentication procedure at least one first client login authentication data which allows at least one client processor to access the at least one intermediary server;
b) code to receive, by the at least one intermediary server, at least one second client login authentication data from at least one host server,
 i) wherein the at least one second client login authentication data is established by the at least one host server using a second authentication procedure,
 ii) wherein the at least one second client login authentication data allows the at least one client processor to access the at least one host server,
 iii) wherein the first authentication procedure is separate from the second authentication procedure, and
 iv) wherein the at least one intermediary server is independently managed from the at least one host server;
c) code to store, by the at least one intermediary server, at least one second client login authentication data, in one or more data structures;
d) code to grant, by the at least one intermediary server, an access to a content of the at least one intermediary server to the at least one client processor when the at least one intermediary server receives the at least one first client login authentication data from the at least one client processor;
e) code to receive, by the at least one intermediary server, a request to access the at least one host server from the at least one client processor; and
f) code to provide, by the at least one intermediary server, the at least one second client login authentication data to the at least one host server after the at least one client processor has connected to the at least one intermediary server, wherein the at least one client processor avoids a need to use the second authentication procedure to access the at least one host server.

8. The method of claim 7, wherein the code to provide the at least one second client login authentication data further comprises code to to transfer the at least one second client login authentication data from the at least one intermediary server to the at least one client processor.

9. The system of claim 7, wherein the code to provide the at least one second client login authentication data further comprises code to transfer the at least one second client login authentication data to the at least one host server from the at least one intermediary server.

10. The system of claim 7, wherein the at least one client processor is selected from the group including: a) a computer; b) a wireless telephone; and c) a Personal Digital Assistant.

11. The system of claim 7, wherein the at least one second login authentication data is provided via the world wide web.

12. The system of claim 11, wherein the at least one second login authentication data is provided in an encrypted format.

13. The method of claim 1, wherein the method further comprises a step of electronically and periodically submitting, by the at least one intermediary server, the at least one second client login authentication data to the at least one host server to confirm a validity of the at least one second client login authentication data.

14. The method of claim 7, wherein the system further comprises code to submit, electronically and periodically, by the at least one intermediary server, the at least one second client login authentication data to the at least one host server to confirm a validity of the at least one second client login authentication data.

* * * * *